United States Patent
Liu et al.

(10) Patent No.: US 12,471,889 B2
(45) Date of Patent: Nov. 18, 2025

(54) ULTRASOUND IMAGING METHOD COMBINING PHYSIOLOGICAL SIGNALS AND AN ELECTRONIC DEVICE

(71) Applicant: SHENZHEN MINDRAY BIO-MEDICAL ELECTRONICS CO., LTD., Guangdong (CN)

(72) Inventors: Shuo Liu, Shenzhen (CN); Yuxin Chen, Shenzhen (CN); Jianguang Zhu, Shenzhen (CN); Dejun Zeng, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 288 days.

(21) Appl. No.: 18/132,123

(22) Filed: Apr. 7, 2023

(65) Prior Publication Data
US 2023/0355216 A1    Nov. 9, 2023

Related U.S. Application Data

(63) Continuation of application No. PCT/CN2020/120231, filed on Oct. 10, 2020.

(51) Int. Cl.
*A61B 8/00* (2006.01)
*A61B 5/0205* (2006.01)
*A61B 5/318* (2021.01)

(52) U.S. Cl.
CPC .......... *A61B 8/5284* (2013.01); *A61B 5/0205* (2013.01); *A61B 5/318* (2021.01);
(Continued)

(58) Field of Classification Search
CPC .................................................. A61B 8/5284
See application file for complete search history.

(56) References Cited

U.S. PATENT DOCUMENTS 5,800,356 A * 9/1998 Criton ................. G01S 7/52036
600/455
7,918,793 B2    4/2011  Altmann et al.
(Continued)

FOREIGN PATENT DOCUMENTS

| CN | 101002689 A | 7/2007 |
| CN | 102804189 A | 11/2012 |

(Continued)

OTHER PUBLICATIONS

First Search dated Feb. 10, 2025, issued in related Chinese Patent Application No. 202080104126.7 (3 pages).
(Continued)

*Primary Examiner* — Colin T. Sakamoto
(74) *Attorney, Agent, or Firm* — Sheppard Mullin Richter & Hampton LLP (57) ABSTRACT

An ultrasonic imaging method combining physiological signals includes: obtaining an ultrasonic image of an examination object acquired by an ultrasonic imaging system at a first time; obtaining a physiological signal of the examination object acquired by a first monitoring device at a second time, where the first time and the second time at least partially overlap; aligning the ultrasonic image and the physiological signal with time; and displaying the aligned ultrasonic image and physiological signal on a same display interface.

19 Claims, 6 Drawing Sheets

(52) U.S. Cl.
CPC .............. *A61B 8/463* (2013.01); *A61B 8/486* (2013.01); *A61B 8/5223* (2013.01); *A61B 8/483* (2013.01); *A61B 8/488* (2013.01)

(56) References Cited

U.S. PATENT DOCUMENTS

| | | | |
|---|---|---|---|
| 8,317,714 B2* | 11/2012 | Hendriks | A61B 8/463 600/443 |
| 10,096,076 B2 | 10/2018 | Johnson et al. | |
| 10,595,826 B2 | 3/2020 | Zhai et al. | |
| 10,874,377 B2 | 12/2020 | Pagoulatos et al. | |
| 11,026,656 B2 | 6/2021 | Belt et al. | |
| 2004/0066389 A1* | 4/2004 | Skyba | G01S 7/52088 345/619 |
| 2007/0066898 A1 | 3/2007 | Hendriks et al. | |
| 2007/0106146 A1* | 5/2007 | Altmann | A61B 8/12 600/407 |
| 2011/0251870 A1 | 10/2011 | Tavares et al. | |
| 2018/0153514 A1* | 6/2018 | Zhai | A61B 5/02444 |
| 2019/0105019 A1* | 4/2019 | Pagoulatos | A61B 5/332 |
| 2021/0038119 A1 | 2/2021 | Souzy et al. | |

FOREIGN PATENT DOCUMENTS

| | | |
|---|---|---|
| CN | 103829941 A | 6/2014 |
| CN | 104545987 A | 4/2015 |
| CN | 104736067 A | 6/2015 |
| CN | 108309353 A | 7/2018 |
| CN | 108472014 A | 8/2018 |
| CN | 109758183 A | 5/2019 |
| CN | 110623686 A | 12/2019 |
| CN | 110974298 A | 4/2020 |
| CN | 111246802 A | 6/2020 |
| CN | 111513765 A | 8/2020 |
| IN | 103584919 A | 2/2014 |
| JP | 2013-078396 A | 5/2013 |
| WO | 2004/049951 A1 | 6/2004 |

OTHER PUBLICATIONS

PCT International Search Report and the Written Opinion mailed Jul. 8, 2021, issued in related International Application No. PCT/CN2020/120231, with partial English translation (10 pages).

PCT International Search Report and the Written Opinion mailed Jun. 25, 2021, issued in related International Application No. PCT/CN2020/141223, with partial English translation (14 pages).

* cited by examiner

ULTRASOUND IMAGING METHOD COMBINING PHYSIOLOGICAL SIGNALS AND AN ELECTRONIC DEVICE

CROSS-REFERENCE TO RELATED APPLICATIONS

This application is a continuation application of International Patent Application No. PCT/CN2020/120231, filed on Oct. 10, 2022.

TECHNICAL FIELD

The present disclosure relates to ultrasonic imaging, and more particularly, to ultrasonic imaging methods combining physiological signal and electronic devices thereof.

BACKGROUND

The disease of a critical ill patient is complex, variable, involving multiple disciplines and application of high-tech equipments, and related to humanistic ethical problems, etc. It can be said that critical ill medicine is a product of the development and integration trend of the medical branch subject, and such integration simultaneously determines the requirements and challenges for the clinical thinking of the ICU doctor, where the most prominent is the comprehensive thinking. That is, in a critical ill scenario, the doctors need to face pathological physiological indexes and parameters of different organs, different devices, different means and different times, perform comprehensive analysis according to their own clinical experience and logical reasoning, determine the current pathological physiological state of the patient, and make a suitable clinical decision.

Volume management is one of the important contents of the treatment of critical ill patients, where capacity status and capacity responsiveness assessment are the core of the volume management. When performing volume management, users need to make comprehensive analysis according to ultrasonic images and other physiological signals. However, at present, the information of the ultrasonic system and other monitoring devices is displayed on their respective screens, and the doctors need to manually export, manually correspond and analyze their respective information, which is time-consuming and labor-intensive and not convenient for clinical research.

SUMMARY

A series of concepts in simplified forms are introduced in the SUMMARY, which will be described in further detail in the DETAILED DESCRIPTION. The SUMMARY of the present disclosure is not intent to define the key features and necessary technical features of the claimed technical solution, much less to determine the protection scope of the claimed technical solution.

The first aspect of the embodiments of the present disclosure provides an ultrasonic imaging method combining physiological signals. The method may include:
  obtaining an ultrasonic image of the examination object acquired by the ultrasonic imaging system at the first time;
  obtaining the physiological signal of the examination object acquired by the first monitoring device at a second time, where the first time and the second time at least partially coincide;
  corresponding the ultrasonic image and the physiological signal in time; and
  displaying the corresponded ultrasonic image and the physiological signal on the same display interface.

The second aspect of the embodiments of the present disclosure provides an ultrasonic imaging method combining physiological signals. The method may include:
  obtaining the ultrasonic image of the examination object acquired by the ultrasonic imaging system;
  obtaining the physiological signal of the examination object acquired by the first monitoring device;
  analyzing the time phase of the physiological signal and the ultrasonic image and/or analyzing the quantitative parameter of the physiological signal and the ultrasonic image to obtain analysis results; and
  displaying the analysis results.

The third aspect of the embodiment of the present disclosure provides an ultrasonic imaging method combining physiological signals. The method may be used in an electronic device that is a monitoring device or a device other than an ultrasonic imaging system and the monitoring device. The method may include:
  obtaining the ultrasonic data of the examination object acquired by the ultrasonic imaging system;
  obtaining the physiological signal of the examination object acquired by the monitoring device; and
  displaying the ultrasonic data and the physiological signal on the same display interface of the electronic device.

The fourth aspect of the embodiment of the present disclosure provides an electronic device including a memory, a processor and a display. The memory may store a computer program that may be executed by the processor to perform the following steps:
  obtaining an ultrasonic image of the examination object acquired by the ultrasonic imaging system at the first time;
  obtaining the physiological signal of the examination object acquired by the first monitoring device at a second time, where the first time and the second time at least partially coincide;
  corresponding the ultrasonic image and the physiological signal; and
  displaying the corresponded ultrasonic image and the physiological signal on the same display interface.

The fifth aspect of the embodiment of the present disclosure provides an electronic device including a memory, a processor and a display. The memory may store a computer program that may be executed by the processor to perform the following steps:
  obtaining the ultrasonic image of the examination object acquired by the ultrasonic imaging system at the first time;
  obtaining the physiological signal of the examination object acquired by the first monitoring device at the second time;
  analyzing the time phase of the physiological signal and the ultrasonic image and/or analyzing the quantitative parameter of the physiological signal and ultrasonic image to obtain analysis results; and
  displaying the analysis results on the display.

The sixth aspect of the embodiment of the present disclosure provides an electronic device that is a monitoring device or a third device other than the ultrasonic imaging system and the monitoring device. The electronic device may include a memory, a processor and a display. The memory may store a computer program that may be executed by the processor to perform the following steps:

obtaining the ultrasonic data of the examination object acquired by the ultrasonic imaging system;

obtaining the physiological signal of the examination object acquired by the monitoring device; and displaying the ultrasonic data and the physiological signal on the same display interface of the electronic device.

The ultrasonic imaging methods combining the physiological signals and the electronic devices of the embodiments of the present disclosure correspond the ultrasonic images and other physiological signals in time and display them on the same display interface, which is convenient for comprehensive analysis thereof.

BRIEF DESCRIPTION OF THE DRAWINGS

In order to more clearly illustrate the technical solutions in the embodiments of the present disclosure, the drawings to be used in the description of the embodiments will be briefly introduced below. However, the drawings in the following description are merely some embodiments of the present disclosure. For those of ordinary skill in the art, other drawings can also be obtained from these drawings without creative effort.

In the drawings.

DETAILED DESCRIPTION

In order to make the examination objectives, technical solutions and advantages of the present disclosure clearer, embodiments of the present disclosure will be described in detail below with reference to the drawings. However, the described embodiments are merely part, but not all, of the embodiments of the present disclosure. It should be understood that the present disclosure is not limited by the embodiments described herein. Based on the embodiments described in the present disclosure, all other embodiments obtained by those skilled in the art without creative effort should fall within the protection scope of the present disclosure.

In the following description, numerous specific details are provided in order to provide a more thorough understanding of the present disclosure. However, it will be apparent to those skilled in the art that the present disclosure may be implemented without one or more of these details. In other examples, some technical features known in the art have not been described in order to avoid confusion with the present disclosure.

It should be understood that the present disclosure can be implemented in different forms and should not be construed as being limited to the embodiments set forth herein. On the contrary, the provision of these embodiments will enable the disclosure to be thorough and complete, and will fully convey the scope of the present disclosure to those skilled in the art.

The terminology used herein is merely for the purpose of describing specific embodiments, but not intended as a limitation to the present disclosure. As used herein, the singular forms "a", "an" and "the/said" are also intended to include the plural forms unless the context clearly dictates otherwise. It should also be understood that the terms "constituting" and/or "including", when used in this specification, determine the presence of said features, integers, steps, operations, elements and/or components, but do not exclude the presence or addition of one or more other features, integers, steps, operations, elements, components and/or groups. As used herein, the term "and/or" includes any and all combinations of related listed items.

In order to thoroughly understand the present disclosure, detailed structures will be proposed in the following description in order to explain the technical solutions proposed by the present disclosure. Alternative embodiments of the present disclosure are described in detail as follows. However, in addition to these detailed descriptions, the present disclosure may also have other implementations.

An ultrasonic imaging system according to an embodiment of the present disclosure will be described with reference to FIG. 1 that shows a schematic structural block diagram of an ultrasonic imaging system 100 according to an embodiment of the present disclosure.

Figure 1:
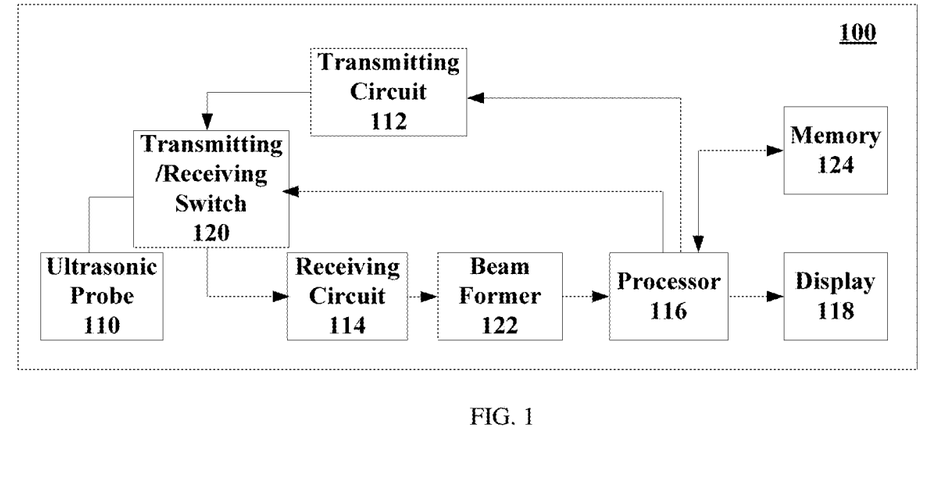
FIG. 1 shows a schematic block diagram of an ultrasonic imaging system according to an embodiment of the present disclosure.

As shown in FIG. 1, the ultrasonic imaging system 100 may include an ultrasonic probe 110, a transmitting circuit 112, a receiving circuit 114, a processor 116 and a display 118. Further, the ultrasonic imaging system may also include a transmitting/receiving switch 120 and a beam former 122. The transmitting circuit 112 and the receiving circuit 114 may be connected to the ultrasonic probe 110 through the transmitting/receiving switch 120.

The ultrasonic probe 110 may include a plurality of transducers. The plurality of transducers may be arranged in a row to form a linear array, or arranged in a two-dimensional matrix to form a matrix array. The plurality of transducers may also form a convex array. The transducer may be used to transmit ultrasonic waves according to the excitation electrical signals, or to convert the received ultrasonic waves into electrical signals. Therefore, each transducer may be used to realize the mutual conversion of electrical pulse signals and ultrasonic waves, so as to realize the transmitting of the ultrasonic waves to the target area of the examination object, and may also be used to receive the ultrasonic echoes reflected by the tissue. When performing ultrasonic examination, the transmitting sequence and the receiving sequence may be used to control which transducers will be used to transmit the ultrasonic waves and which transducers will be used to receive the ultrasonic echoes, or control the transducers to transmit the ultrasonic waves or receive the ultrasonic echoes in time-sharing manner. The transducers participating in the transmission may be excited by the electrical signals at the same time, so as to transmit ultrasonic waves at the same time. Alternatively, the transducers participating in the transmission may also be excited by several electrical signals with a certain time interval, so as to continuously transmit ultrasonic waves with a certain time interval.

During the ultrasonic imaging process, the transmitting circuit 112 may send the delay-focused transmitting pulses to the ultrasonic probe 110 through the transmitting/receiving switch 120. The ultrasonic probe 110 may be excited by the transmitting pulses to transmit an ultrasonic beam to the tissue in the target area of the examination object, and may receive the ultrasonic echoes carrying tissue information reflected from the tissue in the target area after a certain delay and convert the ultrasonic echoes into electrical signals. The receiving circuit 114 may receive the electrical signals converted by the ultrasonic probe 110 so as to obtain the ultrasonic echo signals, and send these ultrasonic echo signals to the beam former 122. The beam former 122 may perform processing such as delay, weighting and channel summation, etc. on the ultrasonic echo signals, and then send them to the processor 116. The processor 116 may perform signal detection, signal enhancement, data conversion, logarithmic compression, etc. on the ultrasonic echo signals to form an ultrasonic image. The ultrasonic image obtained by the processor 116 may be displayed on the display 118 or stored in the memory 124.

The processor 116 may be implemented as software, hardware, firmware, or any combination thereof, and may use single or multiple Application Specific Integrated Circuits (ASICs), single or multiple general purpose integrated circuits, single or multiple microprocessors, single or multiple programmable logic devices, or any combination of the foregoing circuits and/or devices, or other suitable circuits or devices. The processor 116 may control other components in the ultrasonic imaging system 100 to perform the steps of the methods in the various embodiments of the present disclosure.

The display 118 may be connected to the processor 116. The display 118 may be a touch display screen, a liquid crystal display screen, etc. Alternatively, the display 118 may be an independent display such as a liquid crystal display or a television, etc. independent of the ultrasonic imaging system 100. Alternatively, the display 118 may be a display screen of an electronic device such as smart phone or tablet computer, etc. There may be one or more displays 118. For example, the display 118 may include a main screen and a touch screen. The main screen may be mainly used to display the ultrasonic images, and the touch screen may be mainly used for human-machine interaction.

The display 118 may display the ultrasonic image obtained by the processor 116. In addition, the display 118 may also provide the user with a graphical interface for human-machine interaction while displaying the ultrasonic image. One or more control objects may be provided on the graphical interface. The user may input operation instructions through the human-machine interaction device to control these control objects, so as to perform corresponding control operations. For example, an icon may be displayed on the graphical interface, and may be operated by the human-machine interaction device to perform specific functions, such as drawing a region of interest box on the ultrasonic image, etc.

The ultrasonic imaging system 100 may further include other human-machine interaction devices other than the display 118, which may be connected to the processor 116. For example, the processor 116 may be connected to such human-machine interaction device through an external input/output port. The external input/output port may be a wireless communication module, a wired communication module, or a combination thereof. The external input/output port may be implemented based on USB, bus protocols such as CAN, etc., and/or wired network protocols, etc.

The human-machine interaction device may include an input device for detecting user input information. The input information may be, for example, a control instruction for the timing of the ultrasonic transmitting/receiving, an operation input instruction for drawing a point, a line, or a box, etc. on the ultrasonic image, or other instructions. The input device may include a keyboard, a mouse, a scroll wheel, a trackball, a mobile input device (such as a mobile device with a touch display, a mobile phone, etc.), a multi-function knob, etc., or a combination of one or more of them. The human-machine interaction device may further include an output device such as a printer or the like.

The ultrasonic imaging system 100 may further include a memory 124 for storing the instructions to be executed by the processor, storing the received ultrasonic echo data, storing the ultrasonic images, and the like. The memory may be a flash memory card, a solid-state memory, a hard disk, etc. It may be volatile memory and/or non-volatile memory. It may be removable memory and/or non-removable memory, etc.

It should be understood that the components included in the ultrasonic imaging system 100 shown in FIG. 1 are merely illustrative. The ultrasonic imaging system 100 may include more or fewer components, which will not be limited in the present disclosure.

Figure 2:
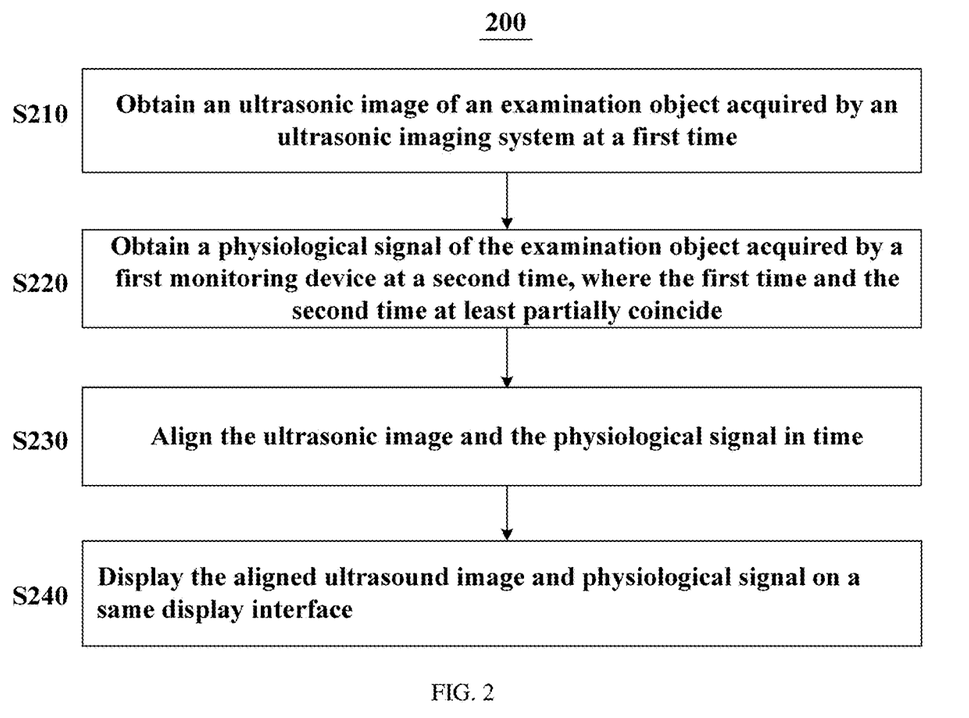
FIG. 2 shows a schematic flowchart of an ultrasonic imaging method combining physiological signals according to an embodiment of the present disclosure.

An ultrasonic imaging method combining physiological signals according to an embodiment of the present disclosure will be described with reference to FIG. 2. FIG. 2 is a schematic flowchart of an ultrasonic imaging method 200 combining physiological signals according to an embodiment of the present disclosure.

As shown in FIG. 2, the ultrasonic imaging method 200 combining physiological signals according to an embodiment of the present disclosure may include the following steps.

In step S210, the ultrasonic image of the examination object acquired by the ultrasonic imaging system at the first time may be obtained.

In step S220, the physiological signal of the examination object acquired by a first monitoring device at a second time may be obtained, where the first time and the second time at least partially coincide.

In step S230, the ultrasonic image and the physiological signal may be corresponded in time.

In step S240, the corresponded ultrasonic image and physiological signal may be displayed on the same display interface.

The ultrasonic imaging method 200 combining physiological signal in the embodiment of the present disclosure can be applied to an ultrasonic imaging system, such as the ultrasonic imaging system 100 described with reference to FIG. 1. When applied to an ultrasonic imaging system, in step S210, the ultrasonic imaging system may acquire the ultrasonic image at the first time, and in step S220, the ultrasonic imaging system may obtain the physiological signal of the same examination object acquired by the first monitoring device at the second time that at least partially coincides with the first time. Illustratively, the first monitoring device may be a respirator, and the physiological signal acquired by the first monitoring device may be a respiratory signal. The respiratory signal may include at least one of the following: a pressure signal, a flow signal, a flow rate signal, and a carbon dioxide partial pressure signal, which respectively represent changes in pressure, flow, flow rate and carbon dioxide partial pressure over time. In addition to the respiratory signals, the physiological signal acquired by the first monitoring device may also include any type of physiological signals of the examination object, such as blood pressure signals, blood oxygen signals, carbon dioxide signals, ECG signals, etc. The first monitoring device may be other monitoring devices for collecting the above-mentioned physiological signals.

The ultrasonic imaging method 200 combining physiological signals in the embodiment of the present disclosure may also be applied to a second monitoring device that is the same or different from the first monitoring device that collects the physiological signals. For example, when the first monitoring device is a respirator, the second monitoring device may either be the respirator itself, that is, the second monitoring device is the same as the first monitoring device, or be a monitor, an anesthesia machine, a central station or a bedside information system, etc., that is, the second monitoring device is different from the first monitoring device, and the first monitoring device may send the physiological signals it acquired to the second monitoring device.

When applied to the second monitoring device, in step S210, the second monitoring device may obtain the ultrasonic image acquired by the ultrasonic imaging system at the first time. In the example that the second monitoring device is the same as the first monitoring device, in step S220, the second monitoring device may acquire the physiological signal at a second time that at least partially coincides with the first time. In the example that the second monitoring device is different from the first monitoring device, in step S220, the second monitoring device may obtain the physiological signal acquired by the first monitoring device at the second time.

In addition, the ultrasonic imaging method 200 combining physiological signals in the embodiments of the present disclosure may also be applied to a third device other than the ultrasonic imaging system and the second monitoring device. Such third device may not be limited to the monitoring device. For example, the third device may be a computer or a workstation, etc. When applied to a third device, in step S210, the third device may obtain the ultrasonic image acquired by the ultrasonic imaging system at the first time, and in step S220, the third device may obtain the physiological signal of the same examination object acquired by the first monitoring device at the second time at least partially coinciding with the first time. When implemented in the third device, the user can more easily view the ultrasonic images and the physiological signals without being limited to viewing them on the ultrasonic imaging system or the monitoring device.

Further, the ultrasonic image and the physiological signal may be transmitted between devices through a network connection. The method may further include establishing a network connection between the devices so as to receive an ultrasonic image data packet containing the ultrasonic image through the network connection or receive a physiological signal data packet containing the physiological signal through the network connection. The network connection may be a wired network connection or a wireless network connection. For example, the devices that are desired to be connected by a wireless network connection (such as the ultrasonic imaging system and the second monitoring device, or the ultrasonic imaging system, the second monitoring device and the third device) may be under the same wireless network hotspot coverage, thereby enabling wireless network connection between the devices through WiFi. The wireless connection between the devices may also be realized in other ways, such as near field communication methods such as Bluetooth and infrared, 4G, 5G or other mobile communication network connection methods.

Specifically, when the method is applied to the ultrasonic imaging system, establishing the network connection may include establishing a first network connection between the ultrasonic imaging system and the second monitoring device. The ultrasonic imaging system may receive the physiological signal data packet containing the physiological signal from the second monitoring device through the first network connection. When the method is applied to the second monitoring device, establishing the network connection may include establishing a second network connection between the ultrasonic imaging system and the second monitoring device. The second monitoring device may receive the ultrasonic image data packet containing the ultrasonic image from the ultrasonic imaging system through the second network connection. When the method is applied to the third device, a third network connection may be established between the third device and the ultrasonic imaging system and a fourth network connection may be established between the third device and the second monitoring device. The third device may receive the ultrasonic image data packet containing the ultrasonic image from the ultrasonic imaging system through the third network connection and receive the physiological signal data packet containing the physiological signal from the second monitoring device through the fourth network connection.

Illustratively, before establishing the network connection, the method may further include performing security verification for the network connection so as to ensure the information security of the examination object.

Specifically, when the first network connection is established between the ultrasonic imaging system and the second monitoring device, the second monitoring device may receive the verification information sent by the ultrasonic imaging system, or, the ultrasonic imaging system may receive the verification information sent by the second monitoring device. The verification information may be verified, and when the verification is passed, the first network connection can be established.

When establishing the second network connection between the ultrasonic imaging system and the second monitoring device, the second monitoring device may receive the verification information sent by the ultrasonic imaging system, or, the ultrasonic imaging system may receive the verification information sent by the second monitoring device. The verification information may be verified, and when the verification is passed, the second network connection can be established.

When establishing the third network connection between the third device and the ultrasonic imaging system and the fourth network connection between the third device and the second monitoring device, respectively, the ultrasonic imaging system may receive the verification information sent by the third device, or, the third device may receive the verification information sent by the ultrasonic imaging system.

The verification information may be verified, and when the verification is passed, the third network connection can be established. The third device may receive the verification information sent by the second monitoring device, or, the second monitoring device may receive the verification information sent by the third device. The verification information may be verified, and when the verification is passed, the fourth network connection can be established.

In step S210, the obtained ultrasonic image may be at least one of a one-dimensional ultrasonic image, a two-dimensional ultrasonic image and a three-dimensional ultrasonic image. The one-dimensional ultrasonic image may be a one-dimensional ultrasonic static image or a one-dimensional ultrasonic video image. The two-dimensional ultrasonic image may be a two-dimensional ultrasonic static image or a two-dimensional ultrasonic video image. The three-dimensional ultrasonic image may be a three-dimensional ultrasonic static image or a three-dimensional ultrasonic video image. The physiological signals obtained in step S220 may include static physiological signals or dynamic physiological signals.

The one-dimensional ultrasonic image can be an M-mode (Time-motion mode) ultrasonic image, which is used to represent the longitudinal motion of the tissue on the one-dimensional sampling line over time. The horizontal axis of the M-mode ultrasonic image represents time, and the vertical axis represents the amplitude of motion. Optionally, the M-mode ultrasonic image may be obtained based on a B-mode ultrasonic acquired in B mode. After the ultrasonic imaging system obtains the B-mode ultrasonic image of the examination object in the B-mode, it may enter the M-mode and acquire the M-mode ultrasonic image according to the M-mode sampling line drawn by the user on the B-mode ultrasonic image or drawn automatically by the ultrasonic imaging system. It may record the sampling information of the same position on the sampling line at different time within a certain period of time and output them in the form of an image so as to obtain an M-mode ultrasonic image. Alternatively, the one-dimensional ultrasonic image may also be a spectral Doppler PW image, etc., which is not specifically limited here.

The two-dimensional ultrasonic image may be a B-mode ultrasonic image, that is, a two-dimensional grayscale ultrasonic image. With reference to FIG. 1, the transmitting circuit 112 may send appropriately delayed electrical signal to each transducer in the ultrasonic probe 110. The transducer may convert the electrical signal into ultrasonic wave and transmit the ultrasonic wave to the target area of the examination object. The receiving circuit 114 may control the ultrasonic probe 110 to receive the ultrasonic echoes of the ultrasonic waves returned from the target area and convert them into electrical signals so as to obtain the first ultrasonic echo signals. After processing such as signal amplification and analog-to-digital conversion, the first ultrasonic echo signals may be transmitted to the beam former 122 for beam forming processing. After that, the beam formed ultrasonic echo signals may be sent to the processor 116. The processor 116 may perform logarithmic compression, dynamic range adjustment, digital scanning conversion or other processes to form a B-mode ultrasonic image representing the tissue morphology of the target area. Alternatively, the two-dimensional ultrasonic image may also be a D-mode ultrasonic image, that is, a color Doppler ultrasonic image, which may be obtained by calculating the blood flow signals according to the ultrasonic echo signals and superimposing the blood flow signals that are color coded on the corresponding B-mode ultrasonic image in real time. Optionally, the two-dimensional ultrasonic image may also be an elastic image. The two-dimensional ultrasonic video image may be dynamic ultrasonic images composed of multiple frames of consecutive two-dimensional ultrasonic static images.

The three-dimensional ultrasonic image may be a three-dimensional image obtained by three-dimensional reconstruction of the two-dimensional ultrasonic images. The three-dimensional ultrasonic image may be acquired by a volumetric probe, by a convex array or a linear array probe with magnetic navigation equipment combining three-dimensional ultrasonic reconstruction technology, or by a matrix probe. The three-dimensional ultrasonic video image may also be referred to as a four-dimensional ultrasonic image, which adds a time dimension parameter on the basis of the three-dimensional ultrasonic image. That is, in a period of time, continuously scanning may be performed to obtain multiple volumes of three-dimensional images, that is, one four-dimensional image, that is, one three-dimensional ultrasonic video image.

In step S230, the ultrasonic image and the physiological signal may be corresponded in time. Illustratively, in the example that both the ultrasonic image and the physiological signal contain a time dimension, for example, the ultrasonic image is an M-mode ultrasonic image, and the physiological signal is a respiratory signal, the corresponding may include corresponding multiple time points one by one. In the example that the ultrasonic image does not contain a time dimension and the physiological signal contains a time dimension, for example, the ultrasonic image is a static B-mode ultrasonic image, and the physiological signal is a respiratory signal, the corresponding may include extracting the time point corresponding to the static B-mode ultrasonic image in the physiological signal. By automatically corresponding the ultrasonic image and the physiological signal by the electronic device implementing the method of the present disclosure, the manual corresponding of the user can be saved, thereby improving the user experience.

In one embodiment, the corresponding of the ultrasonic images and the physiological signal may be realized based on timestamps. For example, referring to FIG. 3, when the method is applied to the ultrasonic imaging system, the second monitoring device may send the physiological signal data packet containing the physiological signals to the ultrasonic imaging system. The physiological signal data packet may also include a timestamp. When the ultrasonic imaging system receives the physiological signal data packet, it analyzes the timestamp therein so as to correspond the physiological signal with the ultrasonic image according to the timestamp. Illustratively, when acquiring the physiological signal, the first monitoring device may add a timestamp at each characteristic location of the physiological signal. The characteristic location may include, for example, the crest, trough, or zero position of the physiological signal, and the like.

Figure 3:
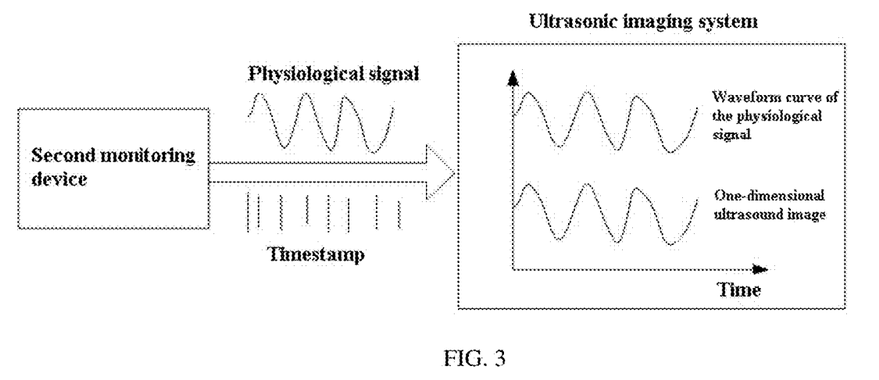
FIG. 3 shows a schematic diagram of a timestamp-based corresponding method according to an embodiment of the present disclosure.

Similarly, when the method is applied to the second monitoring device, the ultrasonic imaging system may transmit the ultrasonic image data packet containing the ultrasonic image to the second monitoring device. The ultrasonic image data packet may further include a timestamp. The second monitoring device may receive the ultrasonic image data packet and analyzes the timestamp so as to correspond the ultrasonic image with the physiological signal according to the timestamp. When the method is applied to the third device, the third device may receive the ultrasonic image data packet sent by the ultrasonic imaging system and the physiological signal data packet sent by the second monitoring device, and analyzes the timestamp therein so as to correspond the ultrasonic image and the physiological signal according to the timestamp.

In another embodiment, in the example that the second monitoring device is the same as the first monitoring device, the ultrasonic image and the physiological signal may be corresponded according to the data transmission time. That is, the timing of the physiological signal may be delayed according to the transmission time of the ultrasonic image data packet. Alternatively, the timing of the ultrasonic image may be delayed according to the transmission time of the physiological signal data packet.

Figure 4:
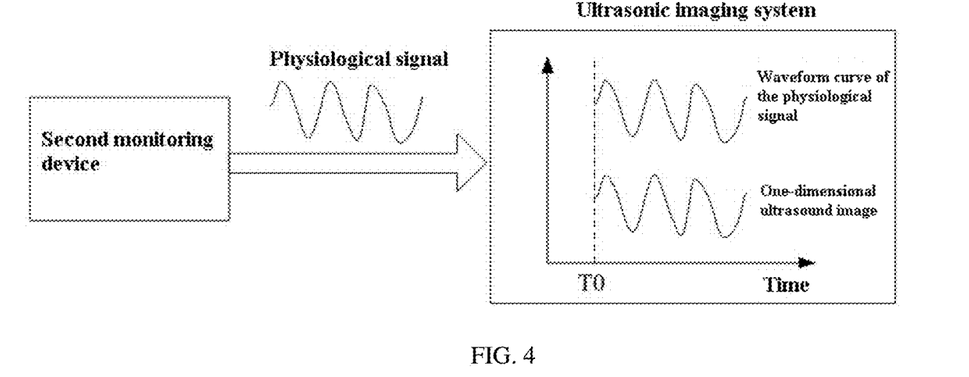
FIG. 4 shows a schematic diagram of a corresponding method based on data transmission time according to an embodiment of the present disclosure.

Referring to FIG. 4, when the methods are applied to the ultrasonic imaging system, the ultrasonic imaging system may receive the physiological signal data packet from the second monitoring device through the network connection. The second monitoring device may preset the transmission time of the physiological signal data packet to be TO according to the network state.

When the ultrasonic imaging system parses the physiological signal data packet, the physiological signal and the transmission time T0 may be obtained. The ultrasonic image may be delayed TO so as to realize the corresponding of the physiological signal and the ultrasonic image in time. Both the ultrasonic image and the physiological signal may be acquired in real time, and the second monitoring device may acquire the physiological signal and send the physiological signal to the ultrasonic imaging system in real time.

Similarly, when the methods are applied to the second monitoring device, the second monitoring device may receive the ultrasonic image data packet from the ultrasonic imaging system through the network connection. The ultrasonic imaging system may preset the transmission time of the ultrasonic image data packet according to the network state. When the second monitoring device parses the ultrasonic image data packet, the physiological signal may also be delayed by the corresponding time, so as to realize the corresponding of the physiological signal and the ultrasonic image in time. When the methods are applied to the third device, the third device may obtain the first transmission time of the ultrasonic image data packet and the second transmission time of the physiological signal data packet, and delay the ultrasonic image by the second transmission time and delay the physiological signal by the first transmission time, thereby realizing the corresponding of the physiological signal and the ultrasonic image in time.

Figure 5:
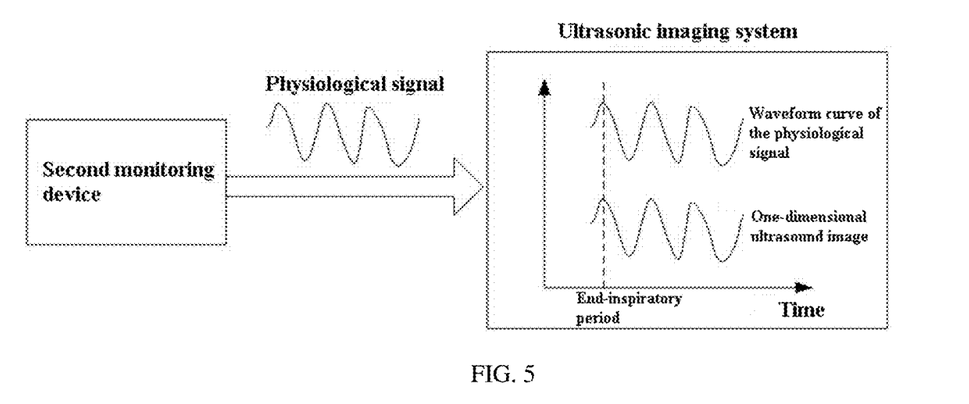
FIG. 5 shows a schematic diagram of a corresponding method based on a preset physiological state according to an embodiment of the present disclosure.

In another embodiment, the corresponding of the ultrasonic image and the physiological signal may be performed based on a preset physiological state. Specifically, a first feature in the physiological signal that represents a preset physiological state may be identified, and a second feature in the ultrasonic image that represents the same preset physiological state may be identified. The first moment corresponding to the first feature in the physiological signal and the second moment corresponding to the second feature in the ultrasonic image may be corresponded, thereby realizing the corresponding of the ultrasonic image and the physiological signal. The preset physiological state may be a physiological state that can be represented by both the physiological signal and the ultrasonic image. Referring to FIG. 5, when the methods are applied to the ultrasonic imaging system, the physiological signal is a respiratory signal and the ultrasonic image is a one-dimensional ultrasonic image, the ultrasonic imaging system may respectively identify the first feature in the physiological signal representing the end-inspiratory period and the second feature representing the end-inspiratory period in the ultrasonic image by an algorithm, and correspond the first moment corresponding to the first feature and the second moment corresponding to the second feature, thereby realizing the corresponding of the ultrasonic image and the physiological signal.

Alternatively, in step S230, the ultrasonic images that are corresponded with the physiological signal may include at least two kinds of the above ultrasonic images, where the at least two kinds of ultrasonic images may be corresponded with the physiological signal respectively. For example, the at least two kinds of ultrasonic images may include but are not limited to B-mode ultrasonic image and M-mode ultrasonic images acquired based on the B-mode ultrasonic images.

In step S240, the corresponded ultrasonic image and physiological signal may be displayed on the same display interface. The user can perform comprehensive analysis based on the corresponded ultrasonic image and physiological signal to more accurately determine the pathophysiological state of the examination object.

Illustratively, when the ultrasonic image is a one-dimensional ultrasonic static image and the physiological signal is a static physiological signal, displaying the corresponded ultrasonic image and physiological signal on the same display interface may include displaying the waveform curves of the corresponded one-dimensional ultrasonic static image and static physiological signal. For example, the one-dimensional ultrasonic static image and the static physiological signal may share the same coordinate axis representing time, such that the amplitude of the one-dimensional ultrasonic data corresponds in time to the amplitude of the static physiological signal. The one-dimensional ultrasonic static images and the static physiological signal may also be displayed in different coordinate systems and the time scales on the axis representing time of the two coordinate systems are corresponded and displayed.

Figure 6A:
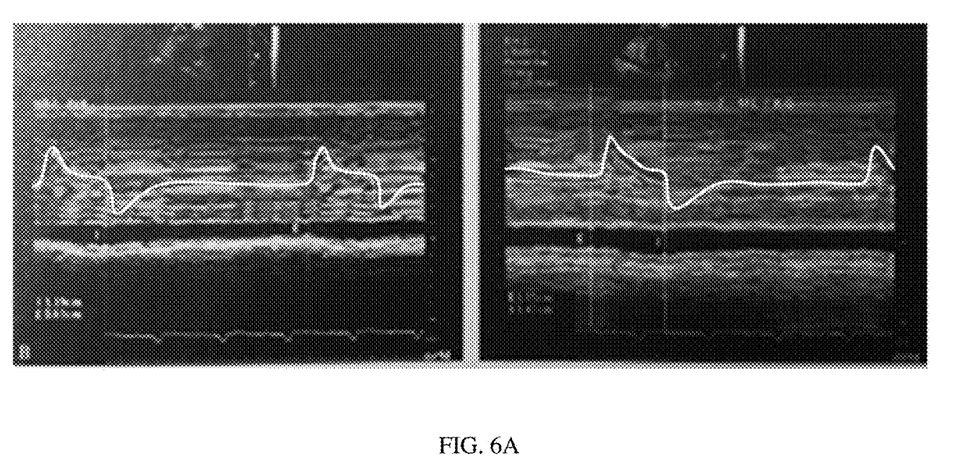
FIG. 6A shows a schematic diagram of displaying the time-corresponded M-mode ultrasonic image and respiratory signal on the same display interface according to an embodiment of the present disclosure.

For example, referring to FIG. 6A, a schematic diagram of a corresponded M-mode ultrasonic image and respiratory signal displayed on the same display interface is shown. In the example of FIG. 6A, the respiratory signal is superimposed on the M-mode ultrasonic image, which facilitates comparative analysis thereof.

Figure 6B:
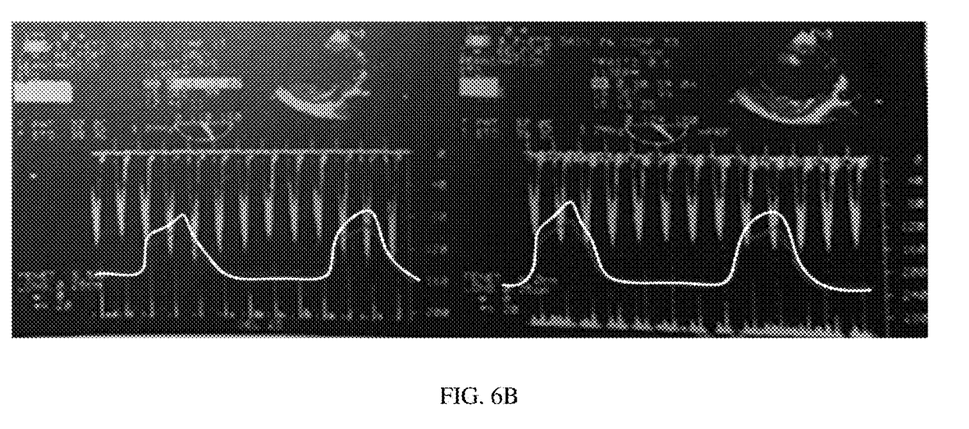
FIG. 6B shows a schematic diagram of displaying the time-corresponded spectral Doppler ultrasonic image and respiratory signal on the same display interface according to an embodiment of the present disclosure.

As another example, referring to FIG. 6B, a schematic diagram of a corresponded spectral Doppler PW ultrasonic image and respiratory signal displayed on the same display interface is shown. In the example of FIG. 6B, the spectral Doppler PW ultrasonic image and the respiratory signal share the same coordinate axis representing time, where, the vertical axis of the spectral PW ultrasonic image is the velocity value and the horizontal axis is time, and the horizontal axis of the respiratory signal is time, and the vertical axis is the amplitude of the respiratory signal.

Similarly, when the ultrasonic image is a one-dimensional ultrasonic dynamic image and the physiological signal is a dynamic physiological signal, displaying the corresponded ultrasonic image and physiological signal on the same display interface may include displaying the waveform curves of the corresponded one-dimensional ultrasonic dynamic image and dynamic physiological signal. The display manner of the one-dimensional ultrasonic dynamic image and the dynamic physiological signal may be similar to that of the static images. The difference is that the dynamic curves are continuously refreshed according to the preset frame rate. In each refreshing, the data at the previous moment may be moved to the preset direction and new data may be added. The presented waveform curve moves with time.

When the ultrasonic image is a two-dimensional ultrasonic static image or a three-dimensional ultrasonic static image, displaying the corresponded ultrasonic image and physiological signal on the same display interface may include displaying the two-dimensional ultrasonic static image or the three-dimensional ultrasonic static image, simultaneously displaying the waveform curve of the physiological signal, and marking the time point corresponding to the two-dimensional ultrasonic static image or the three-dimensional ultrasonic static image on the waveform curve of the physiological signal. Since the two-dimensional ultrasonic static image or the three-dimensional ultrasonic static image corresponds to a single time point, the time point corresponding to the two-dimensional ultrasonic static image, or the three-dimensional ultrasonic static image may be marked on the waveform curve of the physiological signal by a graphic or a symbol.

When the ultrasonic image is a two-dimensional ultrasonic video image or a three-dimensional ultrasonic video image, displaying the corresponded ultrasonic image and physiological signal on the same display interface may include displaying the two-dimensional ultrasonic video image or the three-dimensional ultrasonic video image, simultaneously displaying the waveform curve of the physiological signal, and marking the time point corresponding to the two-dimensional ultrasonic video image or the three-dimensional ultrasonic video image displayed at the current time on the waveform curve of the physiological signal. Since the two-dimensional ultrasonic video image or the three-dimensional ultrasonic video image is dynamic image that changes with time and each frame of image corresponds to a time point, the time points corresponding to the two-dimensional ultrasonic video image, or the three-dimensional ultrasonic video image displayed at the current time may be marked on the waveform curve of the physiological signal by graphics or symbols. The graphics or symbols moves over time on the waveform curve.

In another embodiment, the physiological signal may be represented by values, and displaying the corresponded ultrasonic image and physiological signal on the same display interface may include simultaneously displaying the ultrasonic image and the value of the physiological signal at the time point corresponding to the ultrasonic image currently displayed. In the example that the ultrasonic image is a static ultrasonic image, the static ultrasonic image and the value of the physiological signal at the single time point corresponding to the static ultrasonic image may be displayed simultaneously. In the example that the ultrasonic image is a dynamic ultrasonic image, the dynamic ultrasonic image may be displayed, where while displaying each frame of the dynamic ultrasonic image, the values of the physiological signal at the time point corresponding to said frame may be displayed simultaneously.

The ways of displaying the corresponded ultrasonic images and physiological signal described above may also be combined. For example, the waveform curve of the corresponded one-dimensional ultrasonic image and the waveform curve of the corresponded physiological signal, as well as the two-dimensional ultrasonic image or the three-dimensional ultrasonic image, may be displayed simultaneously on the display interface, and the time point corresponding to the two-dimensional ultrasonic image or the three-dimensional ultrasonic image displayed at the current time may be marked on the waveform curve of the physiological signal with graphics or symbols.

Figure 7:
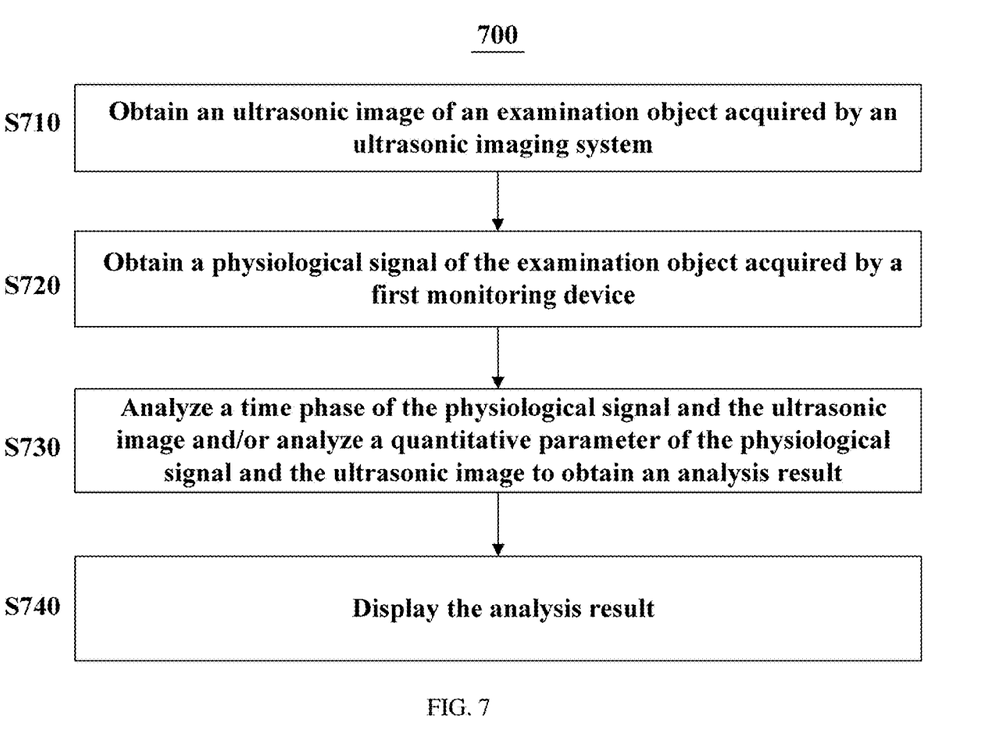
FIG. 7 shows a schematic flowchart of an ultrasonic imaging method combining physiological signals according to another embodiment of the present disclosure.

In some embodiments, the ultrasonic imaging method 200 combining physiological signals may further include comprehensively analyzing the ultrasonic image and the physiological signal to obtain a comprehensive analysis result and displaying the comprehensive analysis result. Regarding the specific details of the comprehensive analysis of the ultrasonic images and the physiological signals, reference may be made to the following description of the ultrasonic imaging method 700 for physiological signals.

The ultrasonic imaging method 200 combining physiological signals in the embodiments of the present disclosure displays the ultrasonic images and the physiological signals on the same display interface after timing corresponding, which facilitates the comprehensive analysis thereof.

Hereinafter, an ultrasonic imaging method combining physiological signals according to another embodiment of the present disclosure will be described with reference to FIG. 7. FIG. 7 is a schematic flowchart of an ultrasonic imaging method 700 combining physiological signals according to an embodiment of the present disclosure. As shown in FIG. 7, the ultrasonic imaging method 700 combining physiological signals may include the following steps.

In step S710, the ultrasonic image of the examination object acquired by the ultrasonic imaging system may be obtained.

In step S720, the physiological signal of the examination object acquired by the first monitoring device may be obtained.

In step S730, a comprehensive analysis may be performed on the time phase of the physiological signal and the ultrasonic image and/or on the quantitative parameter of the physiological signal and the ultrasonic image to obtain a comprehensive analysis result.

In step S740, the comprehensive analysis result may be displayed.

In some embodiments, the method may further include step S740, in which the ultrasonic image, the physiological signal and the comprehensive analysis result may be displayed on the same display interface.

Similar to the ultrasonic imaging method 200 combining physiological signals described above, the ultrasonic imaging method 700 combining physiological signals of the embodiments of the present disclosure may be applied to the ultrasonic imaging system, the second monitoring device, or the third device other than the ultrasonic imaging system and the second monitoring device. The second monitoring device may be the same as or different from the first monitoring device used to acquire the physiological signals of the examination object. In one embodiment, the first monitoring device may be a respirator, and the physiological signal acquired by the first monitoring device may be a respiratory signal. Exemplary, the respiratory signal may include at least one of the following: pressure signal, flow signal, flow rate signal, and carbon dioxide partial pressure signal. The physiological signal may also include any other type of physiological signal of the examination object, such as at least one of a carbon dioxide signal, a blood oxygen signal, a blood pressure signal, and an electrocardiogram signal.

Steps S710 and S720 are similar to steps S210 and S220 of the ultrasonic imaging method 200 combining physiological signals. For details, reference may be made to the relevant description above, which, for brevity, will not be described again.

In step S730, the ultrasonic image and the physiological signal may be comprehensively analyzed to obtain the comprehensive analysis result. Specifically, quantitative parameters may be obtained according to the ultrasonic image and the physiological signal respectively, and then be comprehensively analyzed to obtain the comprehensive analysis result.

In one embodiment, comprehensively analyzing the ultrasonic images and the physiological signals may include comprehensively analyzing the time phase of the physiological signal and the ultrasonic image. The time phase of the physiological signal and the ultrasonic image may be the time phase of various indications about cardiopulmonary interaction. By comprehensively analyzing them, it is beneficial to analyze the cardiopulmonary interaction of the examination object, so as to quickly and easily determine the volume status and volume responsiveness of the examination object. The time phase may also be the time phase of other indications required for volume management.

Taking the first monitoring device being the respirator and the physiological signal acquired by the first monitoring device being the respiratory signal as an example, comprehensively analyzing the time phase of the physiological signal and the ultrasonic image may include: determining the first time corresponding to the peak value of ventilation pressure in the physiological signal; determining the second time corresponding to the peak value of the inner diameter of the inferior vena cava in the ultrasonic image; and calculating a time difference between the first time and the second time, where the time difference can reflect the cardiopulmonary interaction of the examination object.

In another embodiment, comprehensively analyzing the ultrasonic image and the physiological signal may include comprehensively analyzing the quantitative parameter of the physiological signal and the ultrasonic image. The quantitative parameter may be the quantitative parameter of various indications about cardiopulmonary interaction. The quantitative parameter may be used to assist in diagnosis. For example, comprehensively analyzing the quantitative parameter of the physiological signal and the ultrasonic image may include at least one of the following: determining the respiratory frequency according to the respiratory signal, determining the diaphragm displacement according to the ultrasonic image, and calculating the ratio between the respiratory frequency and the diaphragm displacement as the comprehensive analysis result, where the ratio between the respiratory frequency and the diaphragm displacement may also help the doctor to determine whether the respirator can be removed (for example, if the ratio between the respiratory frequency and the diaphragm displacement is not greater than a certain threshold, the respirator can be removed, and said threshold may be, for example, 1.3 times/(min*mm)); and, determining the pleura displacement according to the ultrasonic image, determining the ventilation pressure according to the respiratory signal, and calculating the ratio between pleura displacement and the ventilation pressure as the comprehensive analysis result. The comprehensive analysis may also be a comprehensive analysis of other parameters determined from the ultrasonic images and the physiological signals.

In step S740, the ultrasonic image, the physiological signal, and the comprehensive analysis result obtained in step S730 may displayed on the same display interface. In some embodiments, the ultrasonic image and the physiological signal may be displayed in a time-corresponded manner, as described above.

Based on the description above, the ultrasonic imaging method 700 combining physiological signals according to the embodiment of the present disclosure performs comprehensive analysis on the ultrasonic image and the physiological signal and displays the ultrasonic images, the physiological signals and the comprehensive analysis results on the same display interface, which is convenient for the user to determine the physiological state of the examination object.

Figure 8:
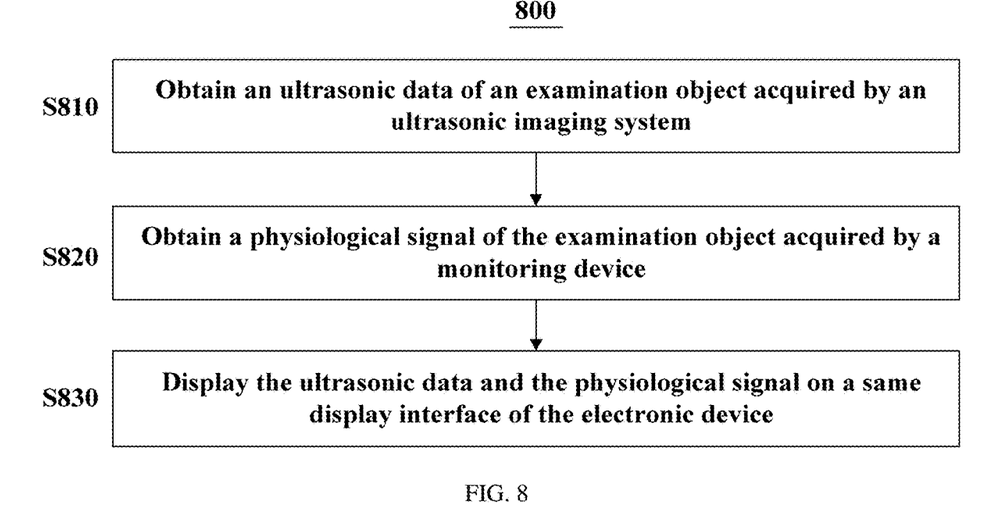
FIG. 8 shows a schematic flowchart of an ultrasonic imaging method combining physiological signals according to yet another embodiment of the present disclosure.

Hereinafter, an ultrasonic imaging method combining physiological signals according to yet another embodiment of the present disclosure will be described with reference to FIG. 8. The method may be used in an electronic device, and the electronic device may be a monitoring device or a third device other than the ultrasonic imaging system and the monitoring device. FIG. 8 is a schematic flowchart of an ultrasonic imaging method 800 combining physiological signals according to an embodiment of the present disclosure.

As shown in FIG. 8, the ultrasonic imaging method 800 combining physiological signals of the embodiment of the present disclosure may include the following steps.

In step S810, the ultrasonic data of the examination object acquired by the ultrasonic imaging system may be obtained.

In step S820, the physiological signal of the examination object acquired by the monitoring device may be obtained.

In step S830, the ultrasonic data and the physiological signal may be displayed on the same display interface of the electronic device.

In the ultrasonic imaging method 800 combining physiological signals according to the embodiment of the present disclosure, the monitoring device or the third device other than the monitoring device and the ultrasonic imaging system obtains the ultrasonic data acquired by the ultrasonic imaging system and the physiological signal acquired by the monitoring device, and displays them on the same display interface. Therefore, the user can simultaneously view the ultrasonic data and the physiological signal on the monitoring device or the third device without going through the ultrasonic imaging system.

Illustratively, when the method is applied to the monitoring device, in step S810, the monitoring device may obtain the ultrasonic data acquired by the ultrasonic imaging system, and in step S820, the monitoring device itself may acquire the physiological signal of the examination object. When the method is applied to the third device, in step S810, the third device may obtain the ultrasonic data acquired by the ultrasonic imaging system, and in step S820, the third device may obtain the physiological signal acquired by the monitoring device. Illustratively, the monitoring device may include, but are not limited to, a respirator, a patient monitor, an anesthesia machine, a central station, or a bedside information system, the third device may be, for example, a computer or a workstations, etc., and the ultrasonic data may be an ultrasonic image or quantitative ultrasonic data.

Based on the description above, in the ultrasonic imaging method 800 combining physiological signals according to the embodiment of the present disclosure, the monitoring device or the third device obtain the ultrasonic data and the physiological signal and displays them on the same display interface. Therefore, the user can simultaneously view the ultrasonic data and physiological signal through the monitoring device or the third device.

Figure 9:
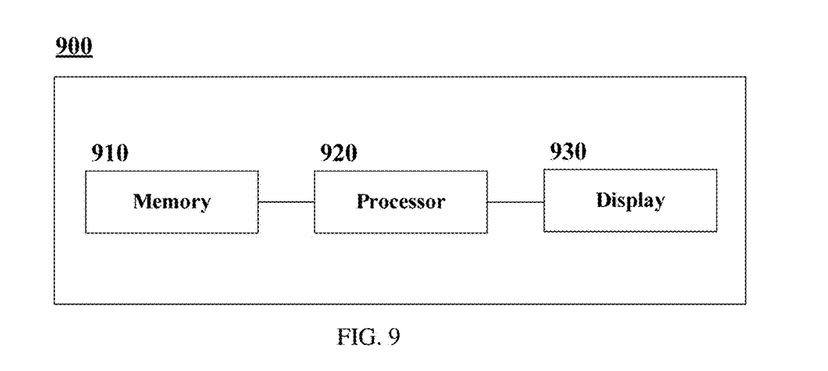
FIG. 9 shows a schematic block diagram of an electronic device according to an embodiment of the present disclosure.

Referring to FIG. 9, the embodiment of the present disclosure also provides an electronic device 900, which can be configured to realize the ultrasonic imaging method 200 combining physiological signal, the ultrasonic imaging method 700 combining physiological signal or the ultrasonic imaging method 800 combining physiological signal. In the following, only the main functions of the electronic device 900 will be described. Regarding other specific details, reference can be made to the description above. As shown in FIG. 9, the electronic device 900 may include a memory 910, a processor 920 and a display 930, and the memory 910 may store a computer program that may be executed by the processor 920.

The processor 920 may be implemented in software, hardware, firmware, or any combination thereof, and may use circuits, single or multiple application specific integrated circuits, single or multiple general purpose integrated circuits, single or multiple microprocessors, single or multiple programmable logic devices, or any combination of the foregoing circuits and/or devices, or other suitable circuits or devices. The processor 920 may control other components in the electronic device 900 to perform desired functions.

The memory 910 may include one or more computer program products, which may include various forms of computer-readable storage media, such as volatile memory and/or non-volatile memory. The volatile memory may include, for example, random access memory and/or cache memory, etc. The non-volatile memory may include, for example, read-only memory, hard disk, flash memory, etc. One or more computer program instructions may be stored on the computer-readable storage medium. The processor 920 may execute the program instructions to realize the model training method and/or various other desired functions in the embodiment of the present disclosure. In the computer-readable storage medium, various application programs and various data may also be stored, such as various data used and/or generated by the application program, etc.

When implementing the ultrasonic imaging method 200 combining physiological signals described above, the electronic device 900 may be implemented as the ultrasonic imaging system (such as the ultrasonic imaging system 100 described with reference to FIG. 1), the monitoring device or the third device. The monitoring device may include, but not limited to, a respirator, a patient monitor, an anesthesia machine, a central stations or a bedside information system. The third device may be, for example, a computer or a workstation, etc. In this case, the computer program stored on the memory 910 may perform the following steps when executed by the processor 920: obtaining the ultrasonic image of the examination object acquired by the ultrasonic imaging system at a first time; obtaining the physiological signal of the examination object acquired by the first monitoring device at a second time, where the first time at least partially coincides with the second time; corresponding the ultrasonic image and the physiological signal in time; and displaying the corresponded ultrasonic image and physiological signal on the same display interface by the display.

When implementing the ultrasonic imaging method 700 combining physiological signals described above, the electronic device 900 may also be implemented as the ultrasonic imaging system, the monitoring device or the third device. In this case, the computer program stored on the memory 910 may perform the following steps when executed by the processor 920: obtaining the ultrasonic image of the examination object acquired by the ultrasonic imaging system at the first time; obtaining the physiological signal of the examination object acquired by the first monitoring device at the second time; comprehensively analyzing the ultrasonic image and the physiological signal to obtain the comprehensive analysis result; and displaying the ultrasonic image, the physiological signal and the comprehensive analysis result on the same display interface by the display.

When implementing the ultrasonic imaging method 800 combining physiological signals described above, the electronic device 900 may be implemented as the monitoring device or the third device other than the ultrasonic imaging system and the monitoring device. The computer program stored on the memory 910 may perform the following steps when executed by the processor 920: obtaining the ultrasonic data of the examination object acquired by the ultrasonic imaging system; obtaining the physiological signal of the examination object acquired by the monitoring device; and displaying the ultrasonic data and the physiological signal on the same display interface by the display.

Based on the description above, the ultrasonic imaging method and ultrasonic imaging system combining physiological signals of the embodiments display the ultrasonic images and the physiological signal on the same display interface, so as to facilitate the comprehensive analysis thereof.

Although exemplary embodiments have been described herein with reference to the drawings, it should be understood that the above-described embodiments are merely exemplary and are not intended to limit the scope of the present disclosure thereto. Various changes and modifications may be made therein by those of ordinary skill in the art without departing from the scope and spirit of the present disclosure. All such changes and modifications are intended to be included within the scope of the present disclosure as claimed by the appended claims.

Those of ordinary skill in the art will understand that the units and algorithm steps of the examples described in conjunction with the embodiments disclosed herein can be implemented in electronic hardware, or a combination of computer software and electronic hardware. Whether these functions are performed in hardware or software depends on the specific application and design constraints of the technical solution. Professionals may use different methods to implement the described functions for each particular application, but such implementation should not be considered beyond the scope of the present disclosure.

It should be understood that the devices and methods disclosed in the embodiments provided in the present disclosure can be implemented in other ways. The device embodiments described above are merely illustrative. For example, the division of the units is only a logical function division, and there may be other division methods in actual implementation. For example, multiple units or components can be combined or integrated into another device, or some features can be ignored or not implemented.

Numerous specific details have been set forth in the specification provided herein. However, it should be understood that the embodiments of the present disclosure may be practiced without these specific details. In some embodiments, well-known methods, structures and techniques have not been shown in detail so as not to obscure the understanding to this specification.

Similarly, it should be understood that, in order to simplify the present disclosure and assist in understanding one or more of the aspects of the present disclosure, in the description of exemplary embodiments of the present disclosure, various features of the present disclosure are sometimes grouped together into a single embodiment, drawing or description thereof. However, the methods of the present disclosure should not be construed to reflect the intent that the claimed scope requires more features than those expressly recited in the claim. Rather, as reflected in the corresponding claims, the corresponding technical problem can be solved with fewer features than all the features of a disclosed single embodiment. Therefore, the claims following the specific embodiment are hereby expressly incorporated into such specific embodiment, where each claim itself is a separate embodiment of the present disclosure.

Those skilled in the art will understand that all features disclosed in this specification (including the claims, abstract and drawings) and all processes or units of any method or device so disclosed may be combined in any manner unless there is mutual exclusion therebetween. Unless expressly stated otherwise, each feature disclosed in this specification (including the claims, abstract and drawings) may be replaced by alternative feature that provide the same, equivalent or similar function.

Furthermore, those skilled in the art will understand that although some embodiments described herein include certain features included in other embodiments but not other features, combinations of the features of different embodiments are meant to be within the scope of the present disclosure and form different embodiments. For example, in the claims, any one of the claimed embodiments may be used in any combination.

The various components of the embodiment of the present disclosure may be implemented in hardware, or in software modules running on one or more processors, or in a combination thereof. Those skilled in the art will understand that some or all of the functions of some modules of the embodiments of the present disclosure may be implemented in practice by microprocessor or digital signal processor (DSP). The present disclosure may also be implemented as programs (e.g., computer programs or computer program products) for performing some or all of the methods described herein. Such programs implementing the present disclosure may be stored on a computer-readable medium, or may be in the form of one or more signals. Such signals may be downloaded from Internet sites, or be provided on carrier signals, or be provided in any other form.

It should be noted that the embodiments above illustrate, but not limit, the present disclosure. Alternative embodiments may be devised by those skilled in the art without departing from the scope of the appended claims. In the claims, no reference signs between parentheses should be construed as limiting the claims. The present disclosure may be implemented by means of hardware including several different elements and by means of a suitably programmed computer. In unit claims enumerating several devices, several of these devices may be embodied by the same hardware item. The use of the words first, second and third, etc. does not indicate any order. These words can be interpreted as names.

The description above is merely the specific embodiments of the present disclosure or explanation to the specific embodiments. However, the protection scope of the present disclosure is not limited thereto. The modifications or alternatives that any person skilled in the art can easily obtain within the technical scope disclosed in the present disclosure should fall within the protection scope of the present disclosure. The protection scope of the present disclosure shall be determined according to the claims.

What is claimed is:

1. An ultrasonic imaging method for combining physiological signals, comprising:
    obtaining an ultrasonic image of an examination object acquired by an ultrasonic imaging system at a first time;
    obtaining a physiological signal of the examination object acquired by a first monitoring device at a second time, wherein the first time and the second time at least partially overlap, the first monitoring device comprises a respirator, an anesthesia machine, or a central station, and the physiological signal comprises at least one of: a pressure signal, a flow signal, a flow rate signal, a carbon dioxide partial pressure signal, a carbon dioxide signal, a blood oxygen signal and a blood pressure signal;
    aligning the ultrasonic image and the physiological signal with time; and
    displaying the aligned ultrasonic image and physiological signal on a same display interface.

2. The ultrasonic imaging method of claim 1, wherein,
    the ultrasonic image comprises at least one of: a one-dimensional ultrasonic static image, a one-dimensional ultrasonic video image, a two-dimensional ultrasonic static image, a two-dimensional ultrasonic video image, a three-dimensional ultrasonic static image, and a three-dimensional ultrasonic video image, and
    the physiological signal comprises a static physiological signal or a dynamic physiological signal.

3. The ultrasonic imaging method of claim 2, wherein, when the ultrasonic image is the one-dimensional ultrasonic static image or the one-dimensional ultrasonic video image, displaying the aligned ultrasonic image and physiological signal on the same display interface comprises:
    displaying a waveform curve of the aligned one-dimensional ultrasonic static image and a waveform curve of the aligned static physiological signal, or
    displaying a waveform curve of the aligned one-dimensional ultrasonic video image and a wave form curve of the aligned dynamic physiological signal.

4. The ultrasonic imaging method of claim 2, wherein, when the ultrasonic image is the two-dimensional ultrasonic static image or the three-dimensional ultrasonic static image, displaying the aligned ultrasonic image and physiological signal on the same display interface comprises:
    displaying the two-dimensional ultrasonic static image or the three-dimensional ultrasonic static image, simultaneously displaying a waveform curve of the physiological signal, and marking a time point corresponding to the two-dimensional ultrasonic static image or the three-dimensional ultrasonic static image on the waveform curve of the physiological signal.

5. The ultrasonic imaging method of claim 2, wherein, when the ultrasonic image is the two-dimensional ultrasonic video image or the three-dimensional ultrasonic video image, displaying the aligned ultrasonic image and physiological signal on the same display interface comprises:
    displaying the two-dimensional ultrasonic video image or the three-dimensional ultrasonic video image, simultaneously displaying a waveform curve of the physiological signal, and marking a time point corresponding to the two-dimensional ultrasonic video image or the three-dimensional ultrasonic video image displayed at current time on the waveform curve of the physiological signal.

6. The ultrasonic imaging method of claim 2, wherein displaying the aligned ultrasonic image and physiological signal on the same display interface comprises:
    simultaneously displaying the ultrasonic image and a value of the physiological signal at a time point corresponding to the ultrasonic image currently displayed.

7. The ultrasonic imaging method of claim 1, further comprising:
    obtaining an ultrasonic image data packet containing the ultrasonic image, or obtaining a physiological signal data packet containing the physiological signal.

8. The ultrasonic imaging method of claim 7, wherein,
    the ultrasonic image data packet further comprises a timestamp, and aligning the ultrasonic image and the physiological signal with time comprises: obtaining the timestamp in the ultrasonic image data packet, and aligning the ultrasonic image and the physiological signal according to the timestamp.

9. The ultrasonic imaging method of claim 7, wherein,
the physiological signal data packet further comprises a timestamp; and
aligning the ultrasonic image and the physiological signal with time comprises: obtaining the timestamp in the physiological signal data packet and aligning the ultrasonic image and the physiological signal according to the timestamp.

10. The ultrasonic imaging method of claim 7, wherein aligning the ultrasonic image and the physiological signal with time comprises:
delaying the physiological signal according to a transmission time of the ultrasonic image data packet, or delaying the ultrasonic image according to a transmission time of the physiological signal data packet.

11. The ultrasonic imaging method of claim 1, wherein aligning the ultrasonic image and the physiological signal with time comprises:
identifying a first feature representing a preset physiological state in the physiological signal, and identifying a second feature representing the same preset physiological state in the ultrasonic image; and
aligning a first moment corresponding to the first feature in the physiological signal and a second moment corresponding to the second feature in the ultrasonic image.

12. The ultrasonic imaging method of claim 1, wherein the first monitoring device further comprises a patient monitor or a bedside information system.

13. The ultrasonic imaging method of claim 1, wherein the physiological signal further comprises an electrocardiogram signal.

14. The ultrasonic imaging method of claim 1, further comprising:
analyzing the ultrasonic image and the physiological signal to obtain an analysis result; and
displaying the analysis result.

15. An ultrasonic imaging method for combining physiological signals, comprising:
obtaining an ultrasonic image of an examination object acquired by an ultrasonic imaging system;
obtaining a physiological signal of the examination object acquired by a first monitoring device, wherein the first monitoring device comprises a respirator, an anesthesia machine, or a central station, and the physiological signal comprises at least one of: a pressure signal, a flow signal, a flow rate signal, a carbon dioxide partial pressure signal, a carbon dioxide signal, a blood oxygen signal and a blood pressure signal;
analyzing a time phase of the physiological signal and the ultrasonic image, or analyzing a quantitative parameter of the physiological signal and the ultrasonic image to obtain an analysis result; and
displaying the analysis result.

16. The ultrasonic imaging method of claim 15, further comprising:
displaying the ultrasonic image, the physiological signal, and the analysis result on a same display interface.

17. The ultrasonic imaging method of claim 15, wherein analyzing the time phase of the physiological signal and the ultrasonic image comprises:
determining a first time corresponding to a peak value of ventilation pressure in the physiological signal;
determining a second time corresponding to a peak value of an inner diameter of inferior vena cava in the ultrasonic image; and
calculating a time difference between the first time and the second time.

18. The ultrasonic imaging method of claim 15, wherein analyzing the quantitative parameter of the physiological signal and the ultrasonic image comprises at least one of:
determining a ratio between a respiratory frequency and a diaphragm displacement; and
determining a ratio between a pleura displacement and a ventilation pressure.

19. The ultrasonic imaging method of claim 15, wherein the physiological signal further comprises an electrocardiogram signal.

* * * * *